(No Model.) 2 Sheets—Sheet 1.
R. M. ALEXANDER.
Seed Planter and Fertilizer Distributer.
No. 231,519. Patented Aug. 24, 1880.
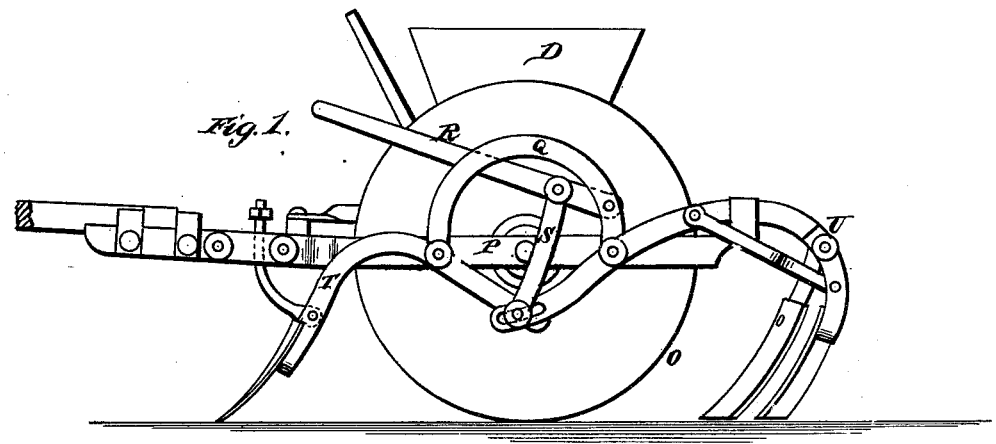
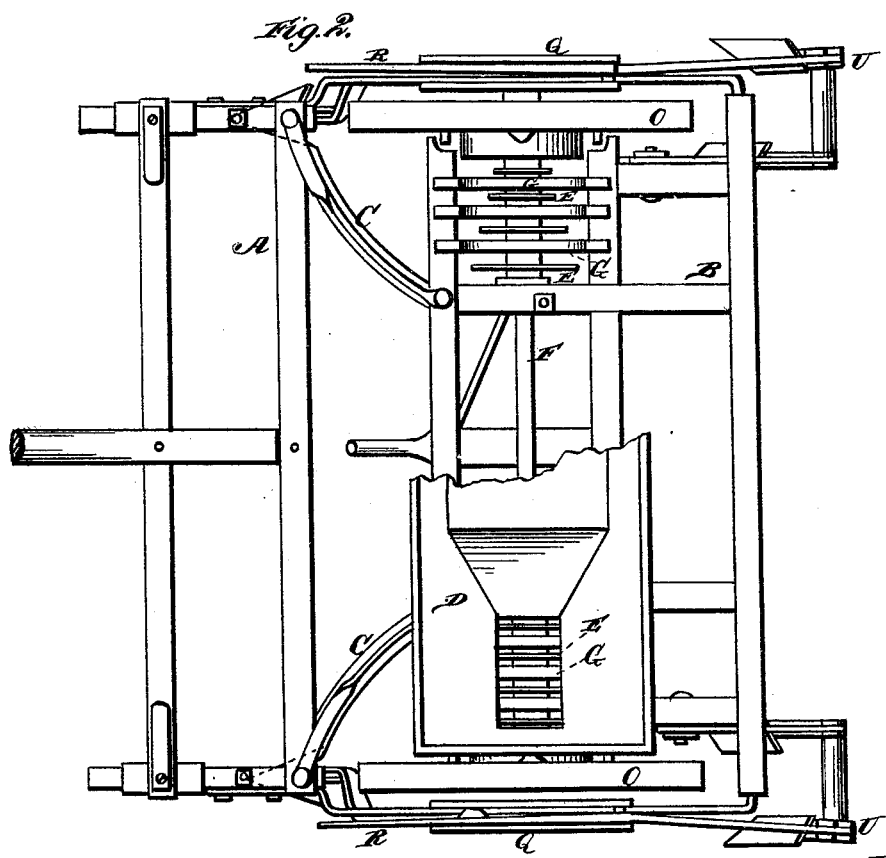
Witnesses.
Robert Everett
James J. Sheehy
Inventor.
Robert M. Alexander.
J. Clement Smith.
Attorney.

(No Model.) 2 Sheets—Sheet 2.
R. M. ALEXANDER.
Seed Planter and Fertilizer Distributer.
No. 231,519. Patented Aug. 24, 1880.
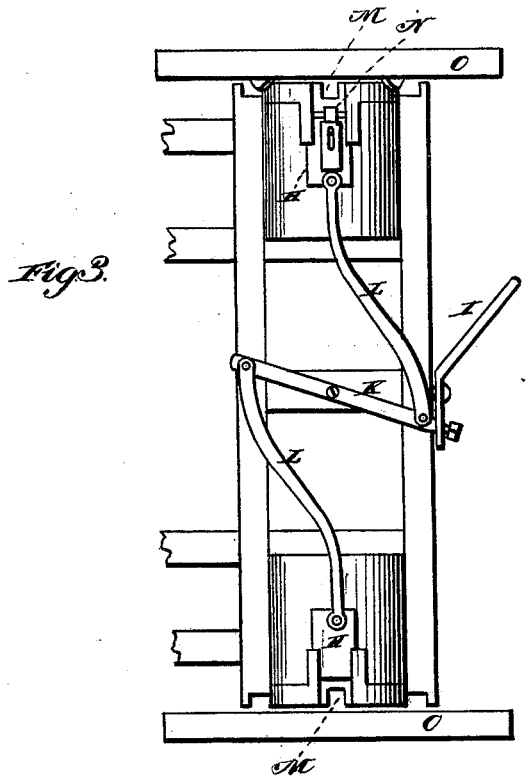
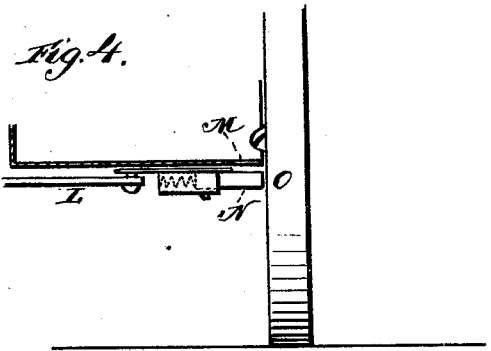
Witnesses.
Robert Everett
James J. Sheehy
Inventor,
Robert M Alexander.
J Clement Smith
Attorney.

UNITED STATES PATENT OFFICE.

ROBERT M. ALEXANDER, OF LINCOLN, ALABAMA.

SEED-PLANTER AND FERTILIZER-DISTRIBUTER.

SPECIFICATION forming part of Letters Patent No. 231,519, dated August 24, 1880.

Application filed June 19, 1880. (No model.)

*To all whom it may concern:*

Be it known that I, ROBERT M. ALEXANDER, a citizen of the United States, residing at Lincoln, in the county of Talladega and State of Alabama, have invented certain new and useful Improvements in Seed-Planter and Fertilizer-Distributer; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.
Figure 1 is a side elevation. Fig. 2 is a plan view. Fig. 3 is a sectional detail plan with the hopper removed, and Fig. 4 is a detail view.

My invention relates to seed-planters and fertilizer-distributers; and it consists in the construction and arrangement of parts, as hereinafter fully set forth and claimed.

The main frame is composed of two parts, A and B, which are connected by the curved bars C. The front frame may have a pole attached to it, or couplings may be provided for thills.

D designates the hoppers for the seed and fertilizing material. Within semi-cylindrical drums below the hoppers are knives E, arranged upon the axle F in such manner that they will form a spiral line of feed-cutters. Bars G are interposed between these knives.

The seed-valves H are operated by the lever I, which connects with them through the medium of the pivoted lever K and the connecting-rods L. The valves have apertures M, which are closed by spring-latches N. When corn is to be planted the tappets on the wheels O, striking against these latches, throw them back, and thus the corn will drop at the required intervals.

P are bars bolted to the sides of the two sections of the main frame. To these bars are bolted the two pairs of curved bars, Q, and between each pair is pivoted a hand-lever, R. To each lever is pivoted a short bar, S, which at its lower end is pivoted to front and rear plow-standards. The front standards, T, are arranged one in advance of each wheel. The rear standards, V, are arranged two in rear of and to the side of each wheel, as shown.

The standards are adapted in any suitable way to receive different kinds of plows. For instance, a furrow is made by a plow in the front standards and fertilizer dropped in the furrow. The plows in the rear standard cover up the furrow. Then, by substituting seed for fertilizer and running the machine again over the field, the furrows will be reopened, the grain sown, and the furrows closed.

What I claim is—

The wheels of the herein-described machine, in combination with the bars P, curved bars Q, hand-levers R, short bars S, and standards T V, as specified.

In testimony whereof I affix my signature in presence of two witnesses.

R. M. ALEXANDER.

Witnesses:
W. I. THORNTON,
M. H. CRUIKSHANK.